J. E. CONKLIN.
TOY VELOCIPEDE.
No. 10,213. Reissued Oct. 10, 1882.
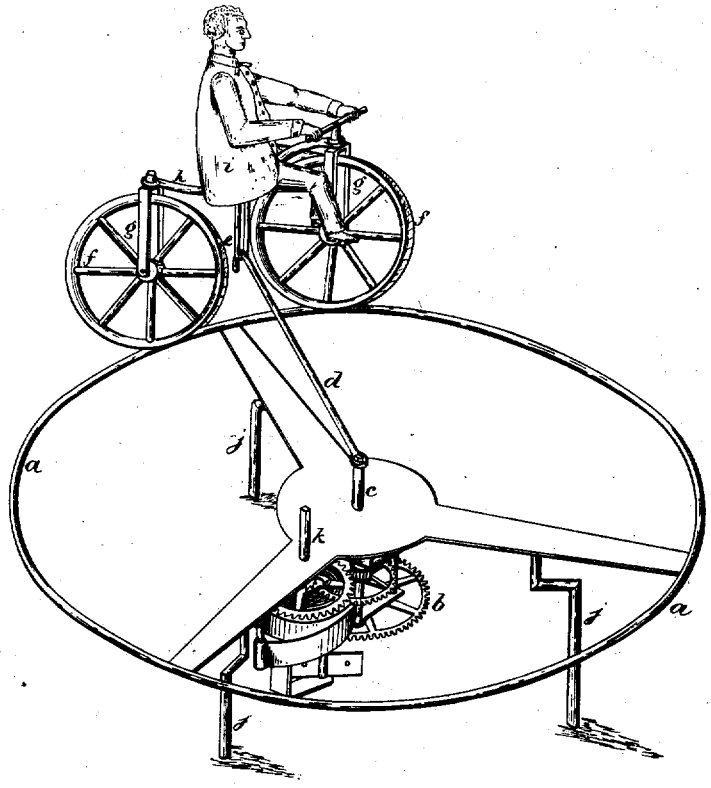
Witnesses
J. Stair
Chr H Smith
Inventor
John E. Conklin
per Lemuel W. Serrell
atty
N. PETERS, Photo-Lithographer, Washington, D. C.

UNITED STATES PATENT OFFICE.

JOHN E. CONKLIN, OF SENECA FALLS, NEW YORK.

TOY VELOCIPEDE.

SPECIFICATION forming part of Reissued Letters Patent No. 10,213, dated October 10, 1882.

Original No. 191,278, dated May 29, 1877. Application for reissue filed September 16, 1882.

*To all whom it may concern:*

Be it known that I, JOHN E. CONKLIN, of the village of Seneca Falls, county of Seneca, and State of New York, have invented certain new and useful Improvements in Toy Velocipedes; and to enable others skilled in the art to make and use the same I will proceed to describe its construction and operation, referring to the drawing, in which the same letters indicate like parts.

In the drawing I have shown a perspective view of my invention.

*a* is a wire hoop for a track. *b* is the propelling-power—a common clock-work movement. *c* is a perpendicular shaft, connected with the clock-work at the lower end of the shaft. *d* is a driving-bar, one end of which is connected to the upper end of shaft *c*, the other end to the frame-work *e* of the velocipede. *f f* are the grooved wheels. *g g* are the swiveled standards. *h* is the reach or bar connecting the wheels. *i* is the figure of a rider. *j j j* are the legs on which the whole toy rests. *k* is the key-arbor for winding the spring of the clock-works.

By winding the spring up and removing the key from the square arbor the velocipede, with its rider, will travel in a circle upon the hoop *a*, thus presenting the appearance of a person actually propelling the machine in a circuitous route.

I am aware that a toy velocipede with a figure and grooved wheels has been made use of before my invention.

I claim as my invention—

A toy having wheels, in combination with a circular track, a central shaft, a spring and gearing to give motion to the central shaft, and an arm from such shaft to the toy, substantially as set forth.

Signed by me this 4th day of September, A. D. 1882.

JOHN E. CONKLIN.

Witnesses:

CHAS. CONKLIN,

GEO. T. PINCKNEY.